US012673676B2

(12) United States Patent (10) Patent No.: US 12,673,676 B2

Gao et al. (45) Date of Patent: Jul. 7, 2026

(54) VEHICULAR OCCUPANT MONITORING SYSTEM

(71) Applicant: Magna Electronics Inc., Auburn Hills, MI (US)

(72) Inventors: Xiaomeng Gao, Cambridge, MA (US); Ashesh Goswami, Somerville, MA (US)

(73) Assignee: Magna Electronics Inc., Auburn Hills, MI (US)

( * ) Notice: Subject to any disclaimer, the term of this patent is extended or adjusted under 35 U.S.C. 154(b) by 231 days.

(21) Appl. No.: 18/416,021

(22) Filed: Jan. 18, 2024

(65) Prior Publication Data

US 2024/0246536 A1 Jul. 25, 2024

Related U.S. Application Data

(60) Provisional application No. 63/482,370, filed on Jan. 31, 2023, provisional application No. 63/480,705, filed on Jan. 20, 2023.

(51) Int. Cl.
| | |
|---|---|
| *B60W 40/08* | (2012.01) |
| *B60W 30/14* | (2006.01) |
| *B60W 50/14* | (2020.01) |
| *G01S 13/88* | (2006.01) |

(52) U.S. Cl.
CPC .......... *B60W 30/143* (2013.01); *B60W 40/08* (2013.01); *B60W 50/14* (2013.01); *G01S 13/88* (2013.01); *B60W 2040/0872* (2013.01); *B60W 2050/143* (2013.01); *B60W 2050/146*

(2013.01); *B60W 2420/408* (2024.01); *B60W 2540/221* (2020.02); *B60W 2540/229* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,243,015 | B1 | 6/2001 | Yeo |
| 6,485,081 | B1 | 11/2002 | Bingle et al. |
| 6,621,411 | B2 | 9/2003 | McCarthy et al. |
| 6,762,676 | B2 | 7/2004 | Teowee et al. |
| 8,013,780 | B2 | 9/2011 | Lynam |
| 8,027,029 | B2 | 9/2011 | Lu et al. |
| 8,063,786 | B2 | 11/2011 | Manotas, Jr. |
| 8,258,932 | B2 | 9/2012 | Wahlstrom |
| 9,146,898 | B2 | 9/2015 | Ihlenburg et al. |

(Continued)

*Primary Examiner* — Todd Melton

(74) *Attorney, Agent, or Firm* — HONIGMAN LLP

(57) ABSTRACT

A vehicular sensing system includes a radar sensor that is operable to capture radar data. The radar sensor includes a transmitter that transmits radio signals and a receiver that receives radio signals. The radar sensor is integrated into a seat body or a seatbelt of the vehicle. Electronic circuitry of an electronic control unit includes a data processor for processing sensor data captured by the radar sensor. The vehicular sensing system, responsive to processing of sensor data captured by the radar sensor while an occupant of the vehicle occupies the seat and/or wears the seatbelt, determines a health characteristic of the occupant.

21 Claims, 11 Drawing Sheets

Radar-based vital sign monitor

(56)  References Cited

U.S. PATENT DOCUMENTS

| | | | |
|---|---|---|---|
| 9,377,852 B1 | 6/2016 | Shapiro et al. | |
| 9,750,420 B1 | 9/2017 | Agrawal et al. | |
| 9,865,150 B2 * | 1/2018 | Branković | G01S 7/03 |
| 9,988,055 B1 | 6/2018 | O'Flaherty et al. | |
| 10,703,204 B2 * | 7/2020 | Hassan | B60K 28/14 |
| 11,433,906 B2 | 9/2022 | Lu | |
| 11,618,454 B2 | 4/2023 | Lu | |
| 12,049,223 B2 | 7/2024 | Keshipeddy | |
| 2007/0055164 A1 | 3/2007 | Huang et al. | |
| 2007/0257804 A1 | 11/2007 | Gunderson et al. | |
| 2009/0156904 A1 | 6/2009 | Shen | |
| 2009/0273487 A1 | 11/2009 | Ferro et al. | |
| 2010/0222687 A1 * | 9/2010 | Thijs | A61B 8/488 |
| | | | 600/508 |
| 2011/0018739 A1 | 1/2011 | Dehais | |
| 2012/0150387 A1 | 6/2012 | Watson et al. | |
| 2013/0070043 A1 | 3/2013 | Geva et al. | |
| 2014/0152792 A1 | 6/2014 | Krueger | |
| 2014/0167967 A1 | 6/2014 | He et al. | |
| 2014/0306814 A1 | 10/2014 | Ricci | |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0232030 A1 | 8/2015 | Bongwald | |
| 2015/0258892 A1 | 9/2015 | Wu | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0090097 A1 | 3/2016 | Grube et al. | |
| 2016/0137126 A1 | 5/2016 | Fursich et al. | |
| 2017/0105104 A1 | 4/2017 | Ulmansky et al. | |
| 2017/0274906 A1 | 9/2017 | Hassan et al. | |
| 2017/0311831 A1 | 11/2017 | Freer et al. | |
| 2017/0337438 A1 | 11/2017 | el Kaliouby, Jr. et al. | |
| 2017/0367590 A1 | 12/2017 | Sebe et al. | |
| 2019/0110729 A1 | 4/2019 | Yamataka | |
| 2020/0143560 A1 | 5/2020 | Lu et al. | |
| 2020/0163560 A1 | 5/2020 | Chang et al. | |
| 2020/0214614 A1 | 7/2020 | Rundo et al. | |
| 2020/0283001 A1 | 9/2020 | Kulkarni | |
| 2024/0383475 A1 | 11/2024 | Keshipeddy | |

* cited by examiner

Radar-based vital sign monitor

Radar sensor

Seat belt

Power and signaling to vehicle battery and ECU

Radar-based vital sign monitor

Car seat

VEHICULAR OCCUPANT MONITORING SYSTEM

CROSS REFERENCE TO RELATED APPLICATIONS

The present application claims the filing benefits of U.S. provisional application Ser. No. 63/482,370, filed Jan. 31, 2023, and U.S. provisional application Ser. No. 63/480,705, filed Jan. 20, 2023, which are hereby incorporated herein by reference in their entireties.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular occupant monitoring system includes a radar sensor disposed at a vehicle equipped with the vehicular occupant monitoring system. The radar sensor senses within an interior cabin of the vehicle. The radar sensor includes a transmitter that transmits radio signals and a receiver that receives radio signals. The radar sensor is integrated into a seatbelt or seat of the equipped vehicle. The radar sensor is operable to capture radar data. The system includes an electronic control unit (ECU with electronic circuitry and associated software. The electronic circuitry of the ECU includes a processor operable to process radar data captured by the radar sensor. The vehicular occupant monitoring system, responsive to processing by the processor of radar data captured by the radar sensor while an occupant of the equipped vehicle wears the seatbelt or occupies the seat, determines a health characteristic of the occupant.

These and other objects, advantages, purposes, and features of the present invention will become apparent upon review of the following specification in conjunction with the drawings.

DESCRIPTION OF THE PREFERRED EMBODIMENTS

A vehicle sensing system and/or object detection system and/or alert system operates to capture sensing data interior of the vehicle and may process the captured data to detect objects within the vehicle, such as to detect occupants within the vehicle. The system includes a processor that is operable to receive sensing data from one or more sensors (e.g., radar sensors or other image sensors) and provide an output, such as an alert or control of a vehicle system.

Figure 1:
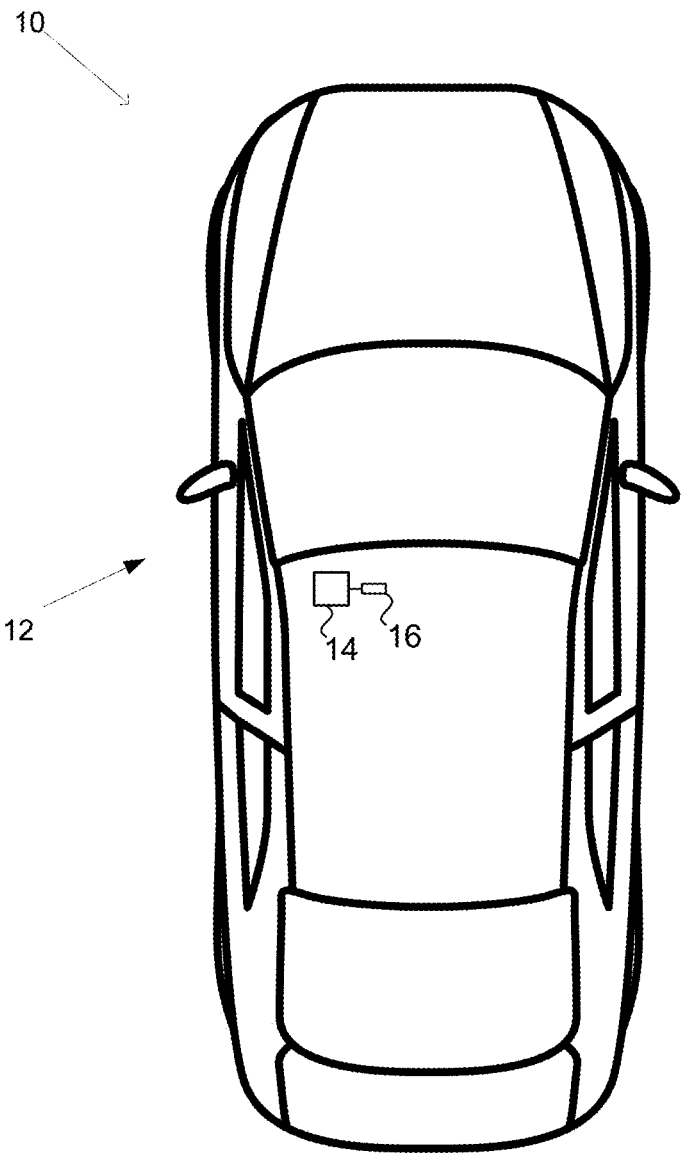
FIG. 1 is a plan view of a vehicle with a vehicular sensing system that incorporates one or more radar sensors.

Referring now to the drawings and the illustrative embodiments depicted therein, a vehicle 10 (FIG. 1) includes a vehicular sensing system 12 that includes at least one radar sensor unit, such as an interior radar sensor 14 (and the system may optionally include multiple interior sensors, such as cameras), which sense regions interior of the vehicle. The sensing system 12 includes a control or electronic control unit (ECU) 16 that includes a data processor that is operable to process data captured by the radar sensor(s). The radar sensor may include a plurality of transmitters that transmit radio signals via plurality of antennas. The radar sensor may also include a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driver monitoring system (DMS) and/or an occupant monitoring system (OMS) of the vehicle, where the DMS/OMS controls at least one function or feature of the vehicle (such as to provide autonomous or semi-autonomous driving control of the vehicle) responsive to processing of the data captured by the radar sensors. The data transfer or signal communication from the sensor to the ECU may comprise any suitable data or communication link, such as a cable or a vehicle network bus or the like of the equipped vehicle.

While advanced driver assistance systems (ADAS) have been gaining interest from many major car manufacturers, in-cabin safety features have also recently drawn attention. As monitoring has become more and more common, the ability to monitor driver consciousness state, vital signs, and health has become an attractive feature for vehicle design. It is known to place cameras at the rear-view mirror/headliner and/or pillars of the vehicle. These active sensing modalities may provide driver monitoring and occupant sensing features to enhance safety and comfort. For example, the system may determine a drowsiness of the driver, detect driver vital signs, provide health monitoring, etc. However, occupants of the vehicle may have concerns about privacy issues when the vehicle is equipped with such image sensors. Moreover, the cameras may require proper encryption to securely protect the occupant's identity and/or image data. Additionally, when placing the cameras at or in the rear-view mirror, there may be interruptions when the driver or other occupant head turns away from the mirror. Other sensors, when installed at headliners or pillars may also suffer from line-of-sight issues, which may require sophisticated design to broaden the detection angle for wide coverage.

Implementations herein provide a non-invasive, continuous health monitoring system for drivers or other occupants of the vehicle, with an accurate and motion-resistant vital sign readout. The systems and/or methods thus solve the need for occupant vital sign (or health characteristic) detection and health monitoring during vehicle operation while minimizing privacy concerns. Optionally, some of the implementations are integrated into a seatbelt such that only minimal modifications are required to the interior body of the vehicle. Some of the implementations may utilize vehicle peripherals to provide add-on benefits to the safety and wellness of the occupant(s).

Figure 2:
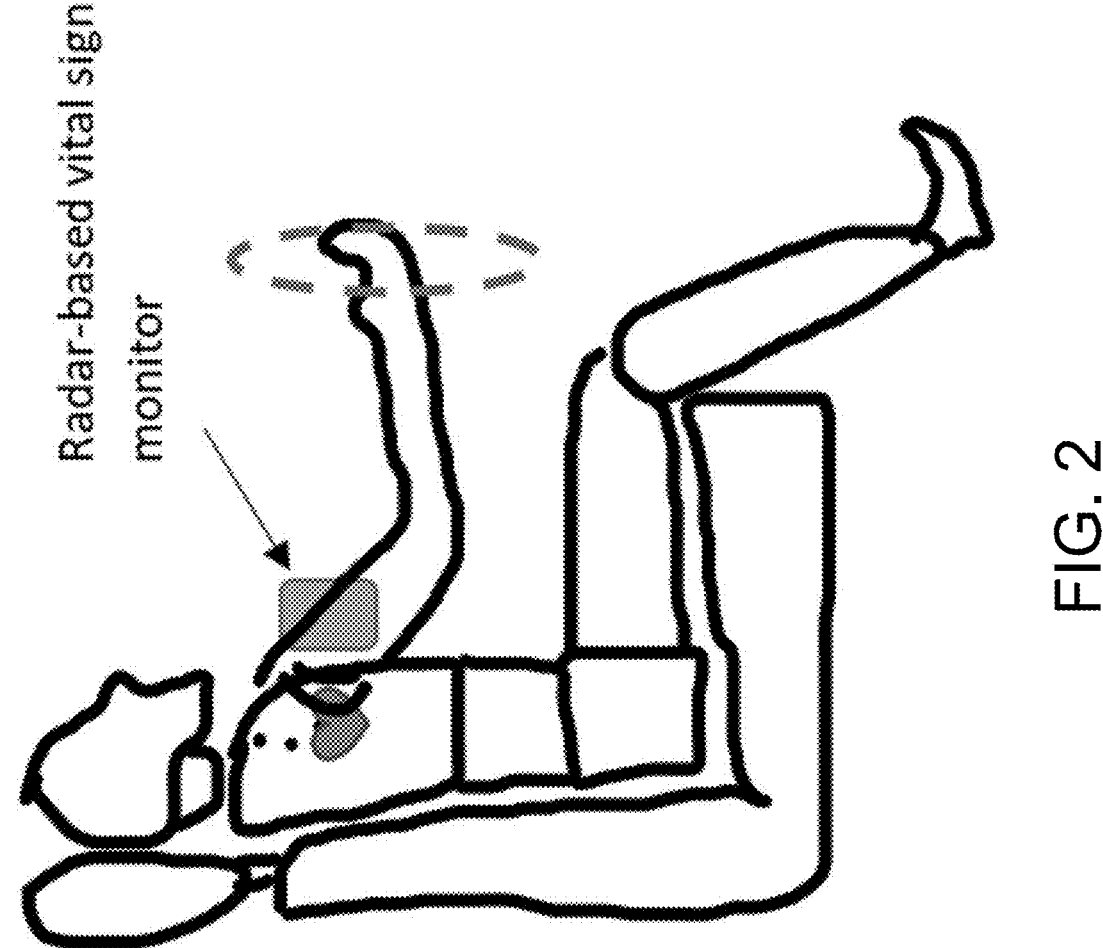
FIG. 2 is schematic view of the vehicular sensing system of FIG. 1 with a radar-based vital sign monitor integrated into a seatbelt of the vehicle.

Thus, implementations herein provide a seatbelt integrated vital sign monitoring system. The system uses a sensor modality with radar motion sensing that determines the expansion/relaxation of the rib cage of an occupant wearing the seatbelt for breathing rate and/or heart pumping motion on the surface of the chest wall for heart rate (FIG. 2). The integration of the sensors at the seatbelt provides a seamless safety feature that comfortably monitors the occupant's (e.g., the driver or a passenger) well-being while traveling within the vehicle. Real-time analysis of the occupant's vital signs may provide indications of, but not limited to, drowsiness, heart condition, breathing issues, etc.

Figure 3:
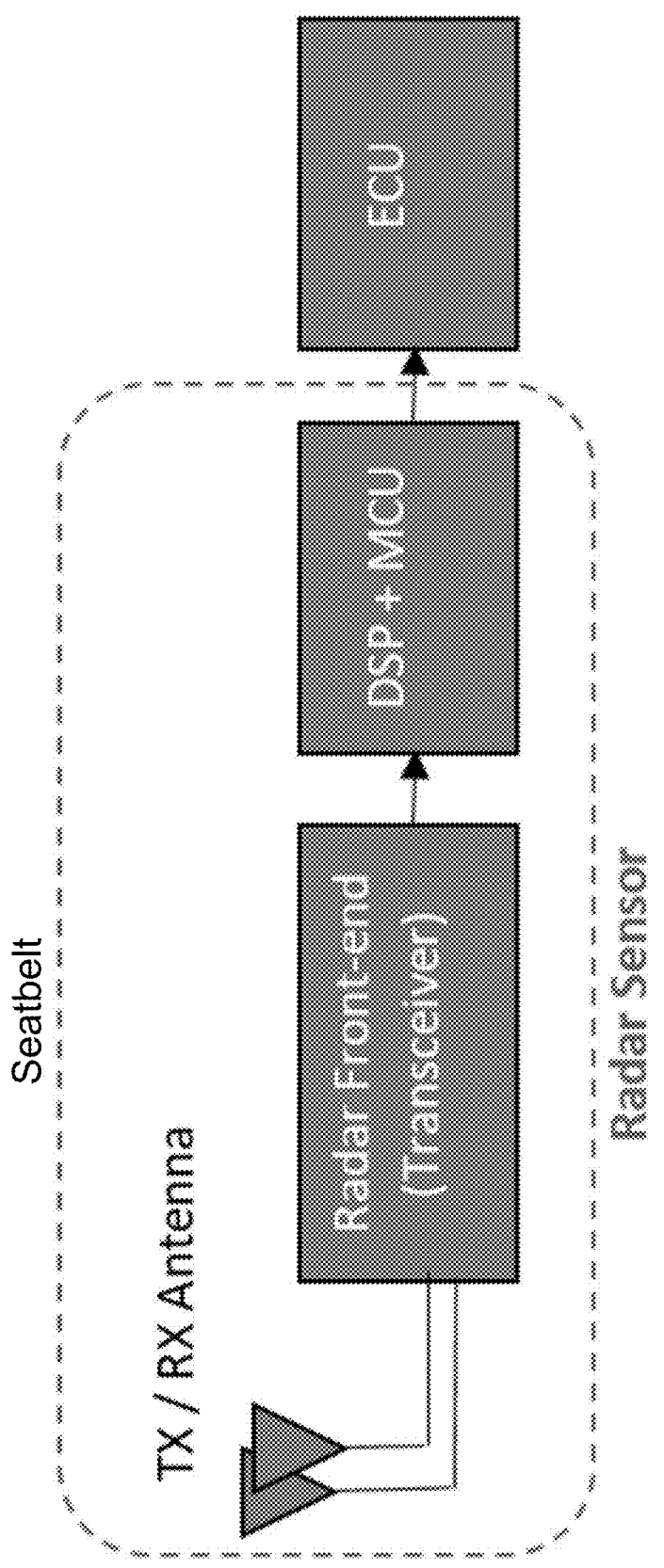
FIG. 3 is a block diagram of the vehicular sensing system of FIG. 1 where the radar sensor is integrated into a seatbelt of the vehicle.
Figure 4:
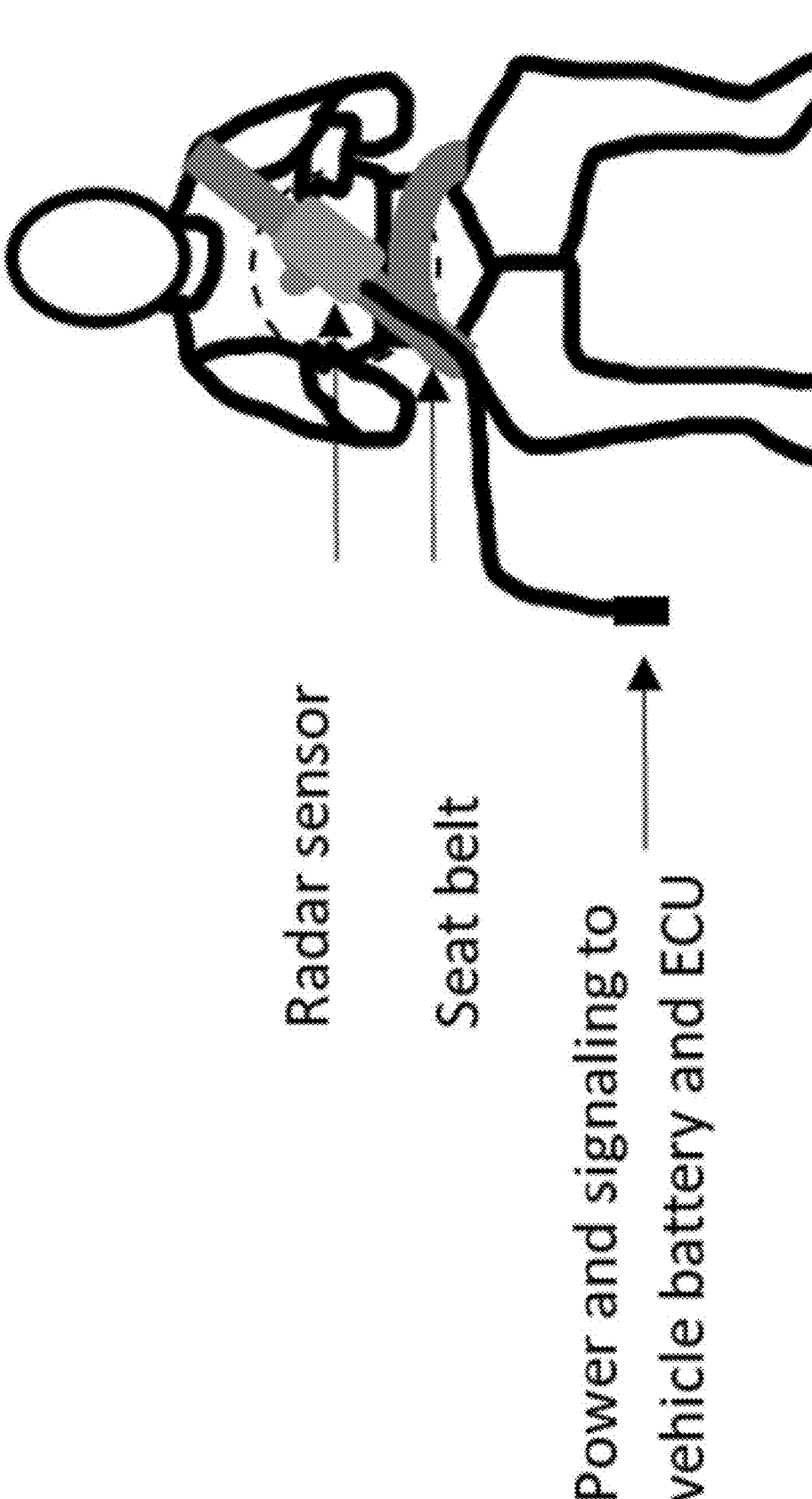
FIG. 4 is another schematic view of the vehicular sensing system of FIG. 1 where the radar sensor is integrated into the seatbelt.
Figure 5:
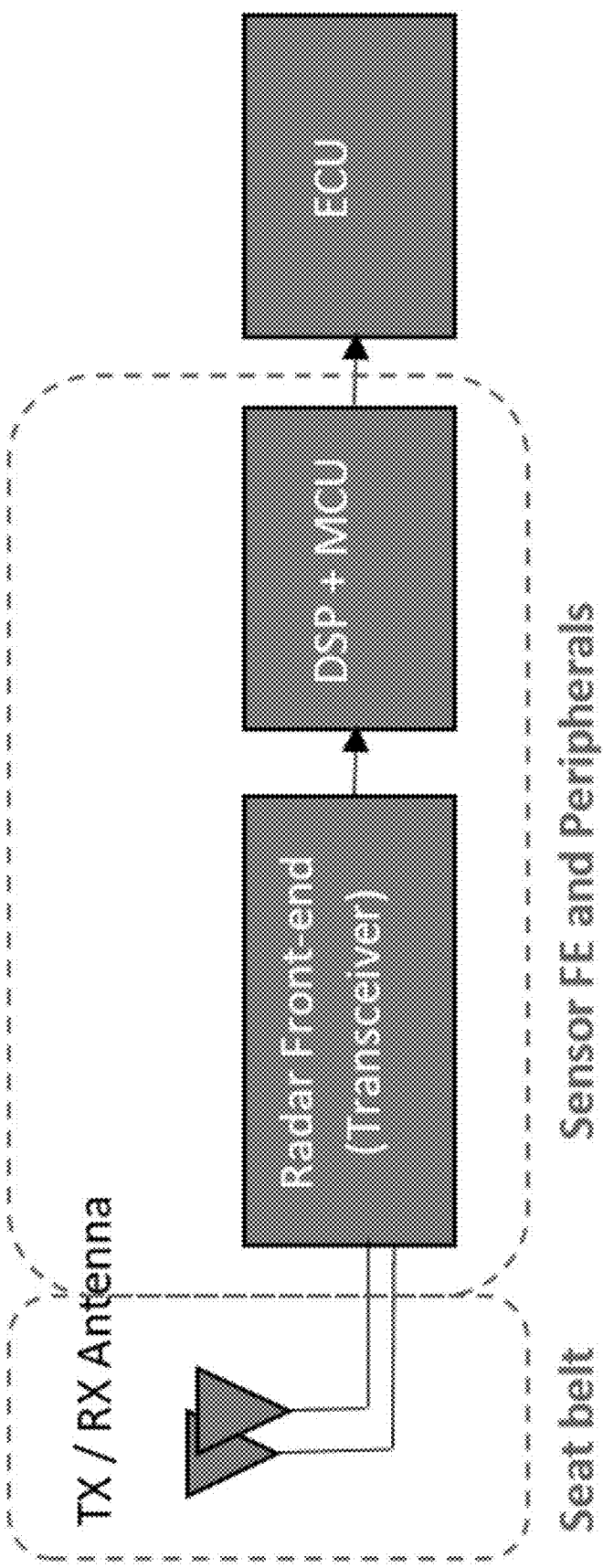
FIG. 5 is a block diagram of the vehicular sensing system of FIG. 1 where antennas of the radar sensor are integrated into a seatbelt of the vehicle and a transceiver of the radar sensor are remote from the seatbelt.
Figure 6:
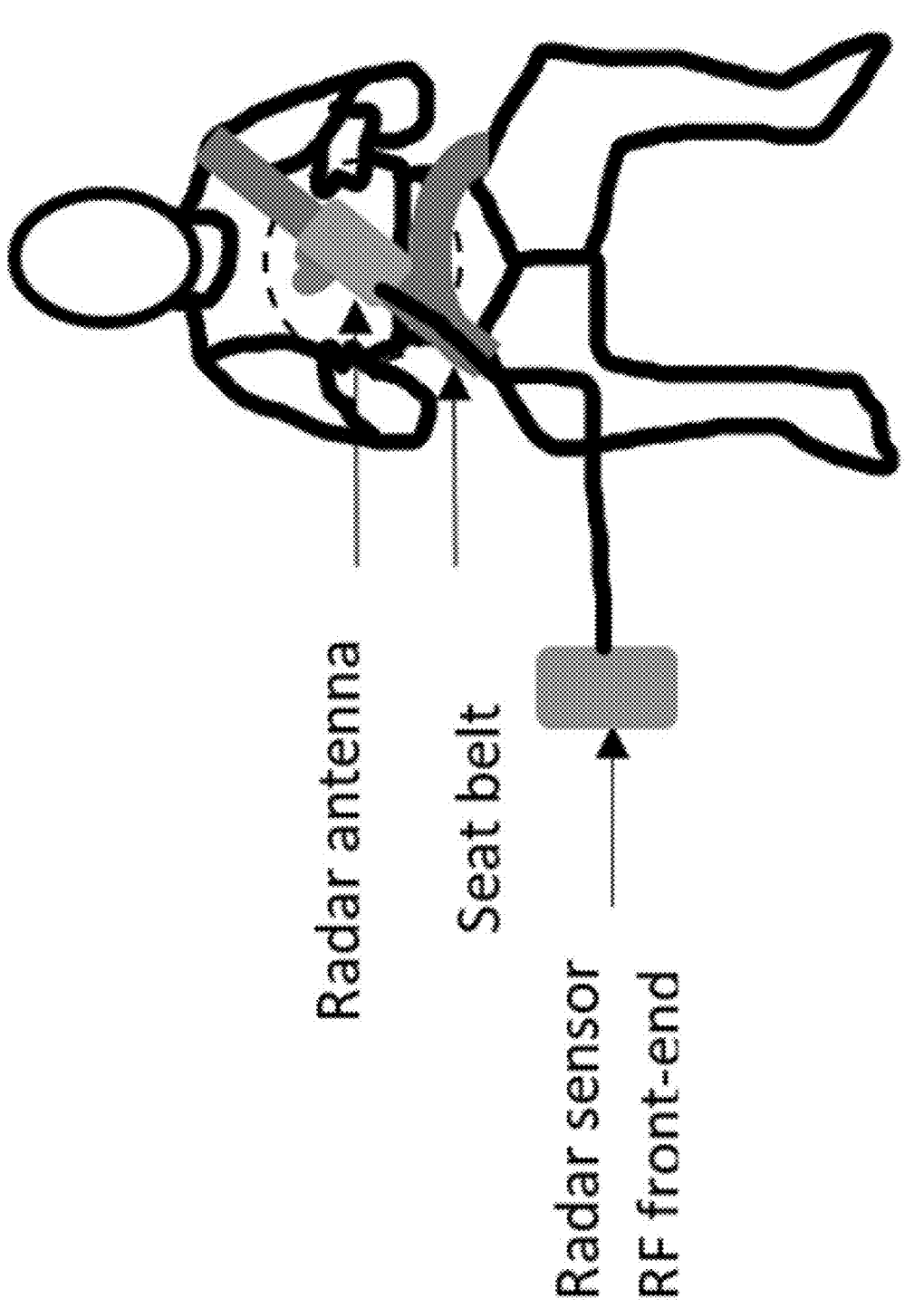
FIG. 6 is another schematic view of the vehicular sensing system of FIG. 1 where the radar sensor is distributed.

The vehicular sensing system includes one or more radar sensors (e.g., the radar sensor 14) disposed at one or more seatbelts of the vehicle. The radar sensor(s) each emit radio waves at, for example, frequencies of 1-100 GHz, which modulates chest wall movements into return echoes/reflections. Optionally, the system operates at 60 GHz to minimize interference with external radars (e.g., employed by other systems or functions of the vehicle). By comparing the transmitting and receiving signals, the system may extract the occupant's vital sign information non-invasively. The system does not require the occupant to wear any electrodes or wires and instead only must wear the seatbelt as the occupant normally does. The tension of the seatbelt ensures that the radar sensor is pressed against the occupant's chest, which stabilizes measurements and allows the measurements to be less prone to body motion-caused noise. As shown in FIGS. 3 and 4, the sensing system may include the radar sensor (including the antennas and the processing elements, such as a digital signal processor (DSP)) integrated into the seatbelt. In other examples, such as shown in FIGS. 5 and 6, the sensing system may be distributed, such that a portion of the radar sensor is remote from the seatbelt (e.g., front-end components), but is in communication with antennas integrated into the seatbelt. For example, the radar sensor front-end is distributed elsewhere for power and/or space purposes. In either example, the system performs data collection, processes the collected data, and generates results to send to a vehicle ECU for alert, display, recording, control of the vehicle, etc.

The system processes the radar sensor data captured by the radar sensor to provide phase information that directly correlates to chest wall movement of the wearer of the seatbelt. This movement captured/measured by the radar sensor can generally be assumed to be a combination of rib cage expansion/relaxation motion and heart apex pounding (on the inner thorax) motion, which corresponds to respiration and heartbeat, respectively. Optionally, the system applies filtering on the phase to separate the respiration and heartbeat elements of the data, which yields vital signs such as breathing rate (BR), heart rate (HR) and heart rate variability (HRV). By analyzing/processing the vital signs of an individual, the system may determine the health status or a health characteristic of the driver. The health status or health characteristic may include sleepiness/drowsiness, losing consciousness, or other conditions that may inhibit control of the vehicle and/or may require medical care. Optionally, the system may periodically store the determined vital signs to or at a profile associated with the particular occupant wearing the seatbelt (who may be recognized in a number of ways, such as via an image sensor, a mobile device possessed by the occupant, a user selection, a size/weight of the occupant, etc.).

The system may compare the vital signs or other health characteristics to a health threshold value to determine whether generating an alert is warranted (e.g., the health characteristic satisfies the health threshold value by exceeding or failing to exceed the health threshold value). The health threshold value may be based on specific characteristics of the occupant (e.g., gender, age, size, etc.). The characteristics may be stored at a profile associated with the occupant (e.g., stored at the vehicle, at a mobile device in communication with the vehicle, or at a remote server in wireless communication with the vehicle). Additionally or alternatively, the health threshold value is based on common values for the specific populations or demographics. The health threshold value may also be based on any other appropriate parameters. The system may periodically compare current vital signs or other health characteristics to historical vital signs or historical health characteristics determined previously by the system (e.g., earlier in the same drive and/or previous drives) to determine changes or trends in the data. The system may alert/warn the occupant when the system determines changes that warrant attention (e.g., the health characteristics vary or change by at least a threshold amount from historical values).

When the system determines any relevant conditions occur (e.g., the system determines that a health characteristic satisfies a health threshold value, such as by exceeding the health threshold value or failing to exceed the health threshold value), the system may generate an alert, such as visual alert (e.g., displayed on one or more displays within the vehicle), an audible alert (e.g., played over a speaker system of the vehicle), and/or a haptic alert (e.g., vibrations of the steering wheel or seat). Optionally, the system may transmit an alert to a remote server (e.g., via the Internet) and/or to a mobile device associated with the occupant. When the system determines an emergency condition, the system may automatically notify emergency or medical services. Optionally, the system may initiate or control one or more ADAS features to control the vehicle (e.g., stop or slow the vehicle) and to safely and call for help. The system may rely on the vehicle or a user device of the occupant for communications.

Figure 7:
FIG. 7 is a block diagram of the vehicular sensing system where an antenna of the radar sensor is integrated into a seatbelt of the vehicle and other components of the radar sensor are remote from the seatbelt.

Referring now to FIG. 7, optionally, the system includes a machine learning model (e.g., a neural network) that is trained on training data (e.g., data collected from radar sensors worn by occupants) to predict the existence of health conditions/characteristics relevant to the occupant and/or vehicle using radar data. The model may be trained on data collected from a large number of different users and then fine-tuned with data collected from the particular occupant wearing the seatbelt. Training the model may cause the model to update any number of weights or parameters of the model. Optionally, the system uses a different model for each occupant that wears the seatbelt (e.g., each model is associated with a respective profile that is associated with a respective occupant) and each model is trained specifically for a single occupant using training data gathered when the particular occupant wears a seatbelt with the integrated radar sensor.

Typical image sensors, such as cameras disposed in overhead mirrors or dashboards used in DMS and OMS applications, monitor occupants using image sensors such as cameras in overhead mirrors or dashboards, which suffer from privacy and line-of-sight issues. Thus, the sensing system described herein is advantageous as it provides occupant vital sign monitoring issue by integrating a radar sensor directly into the seatbelt. The radar sensor delivers precise motion measurement which leads to accurate vital sign sensing without the associated privacy concerns. The contact manner (e.g., the seatbelt maintaining contact with the chest of the occupant) alleviates line-of-sight issues for the radar sensor to provide continuous monitoring of the health status of the occupant as long as the seatbelt is worn.

In some implementations, the vehicular sensing system includes a radar sensor integrated into a car seat within the vehicle. This allows the health/vital monitoring device to extend to child occupants in the vehicle. However, it should be noted that the same technology can be utilized for a child-presence detection application, as explicitly stated herein. Leaving a child unattended in a parked car, even for a couple of minutes (e.g., on a hot day when the car is exposed to sunlight), can lead to severe injury like heat stroke and trauma. In-cabin temperatures can reach a critical level in just 15 minutes and leaving windows half-open often does little to reduce the threat. Thus, when placed in a car seat with safety buckles and a harness in place, a child's inability to exit the vehicle on their own puts them in danger when left unattended. In some examples, the vehicular sensing system provides a simple, low-cost solution for child presence detection, in response to, for example, the rising demand and mandate that many regulatory agencies and programs set in detecting children left unattended inside vehicles. The system may help to solve the issue of child presence detection in parking mode without the necessity of having to develop different solutions for different types of vehicles.

In some examples, the system includes a vital sign monitor embedded in a car seat that can detect breathing and heartbeat activities of an infant or toddler or a child occupying the car seat while the vehicle is parked and the driver and/or other occupants (e.g., adults) have left the vehicle. The vital sign monitor may use radar technology as discussed above to detect fine motion of the child's upper torso to determine a breathing rate and heart rate, which indicates presence of the child in the car seat. The car seat embedding feature helps alleviate the need of devising individual solutions for individual cars due to their dependency on mounting height, angle, form factor, presence of sunroof, one-row vs. two-row solutions, etc., that occurs when the vital sign sensor is mounted separately inside the vehicle.

A short-range radar sensor sends radio signals to measure a child's chest wall motion due to cardiopulmonary activity. Their breathing rate and heart rate may be captured to be used as indicators of child presence. When left alone in a parked vehicle, this vital sign confirmation information may trigger a vehicle alarm and/or an alert/notification to a remote device, such as the driver's mobile device, emergency services, etc. In some examples, the vehicle may generate a visual and/or audible alert for those in the vicinity of the vehicle (e.g., flashing lights, honking a horn, etc.).

Figure 8:
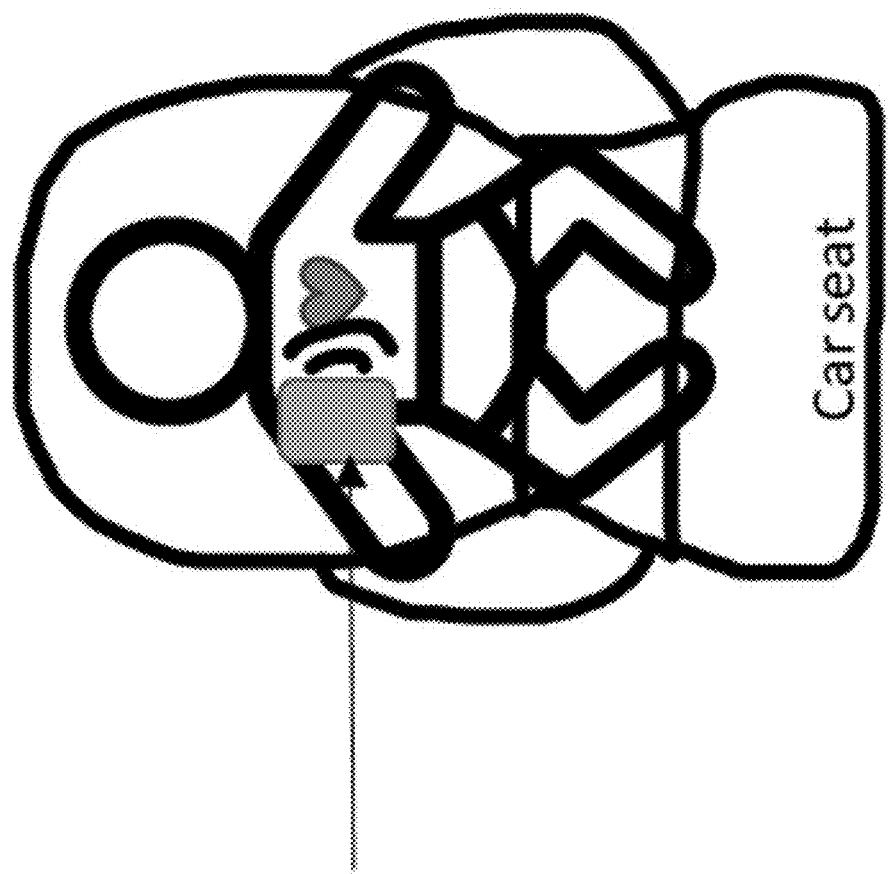
FIG. 8 is a schematic view of the vehicular sensing system of FIG. 1 where the radar sensor is integrated into a car seat disposed within the vehicle.

As shown in FIG. 8, the sensor is integrated into the car seat, which is movable, transferrable, and fire-retardant. The sensor is non-intrusive, minimally invasive, and may be wired to the vehicle battery and control system. For example, the radar sensor is integrated into a seat belt or harness or cushion of the car seat. The features acquired by the sensor onboard computing module may send triggering signals to the ECU of the vehicle or, for example, an owner or driver's smartphone based on configuration (e.g., options selected by the owner/user), a temperature of the cabin of the vehicle, mitigating factors (e.g., the air conditioner is active or windows are down), and/or further actions. The car seat may include an integrated ECU or other processor that processes the radar data captured by the radar sensor and transfers the processed radar data and/or the alert to an ECU of the vehicle.

Figure 9:
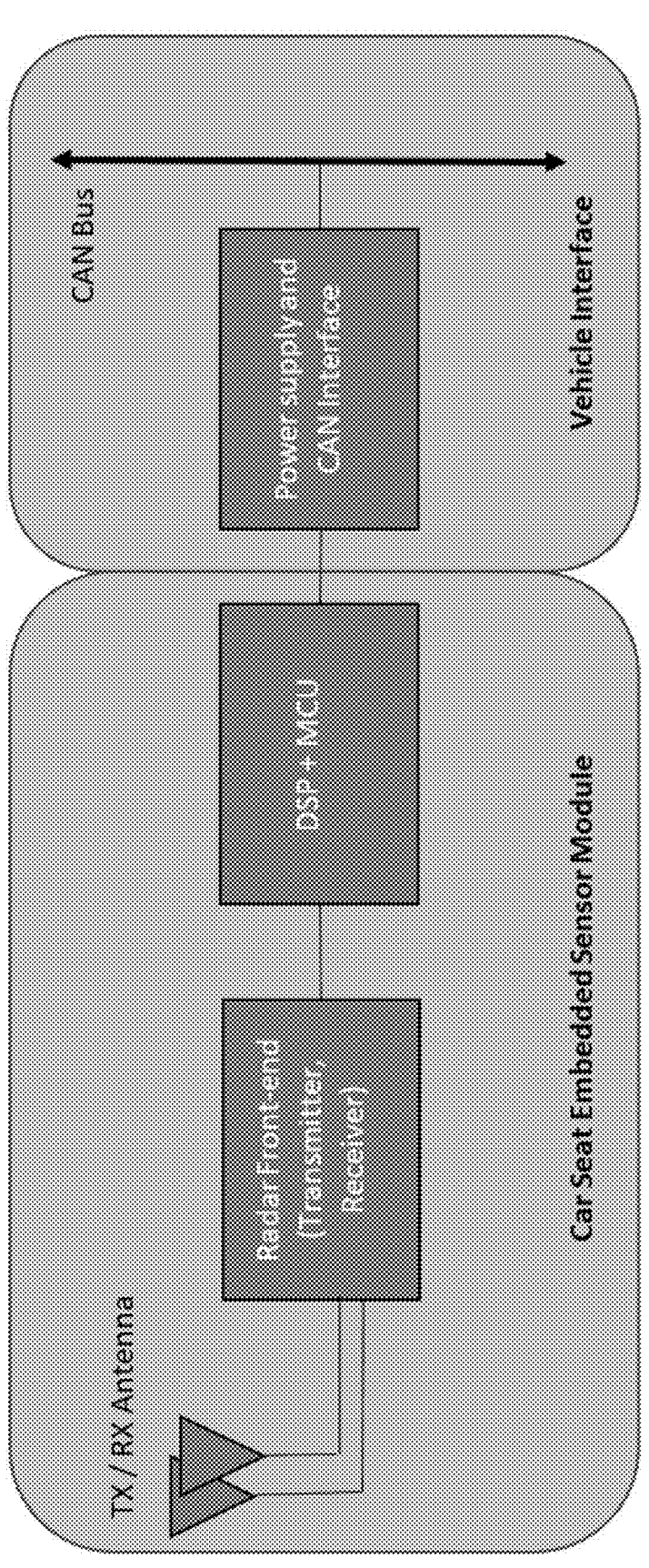
FIG. 9 is a block diagram of the vehicular sensing system where the radar sensor is integrated into a car seat disposed within the vehicle.
Figure 10:
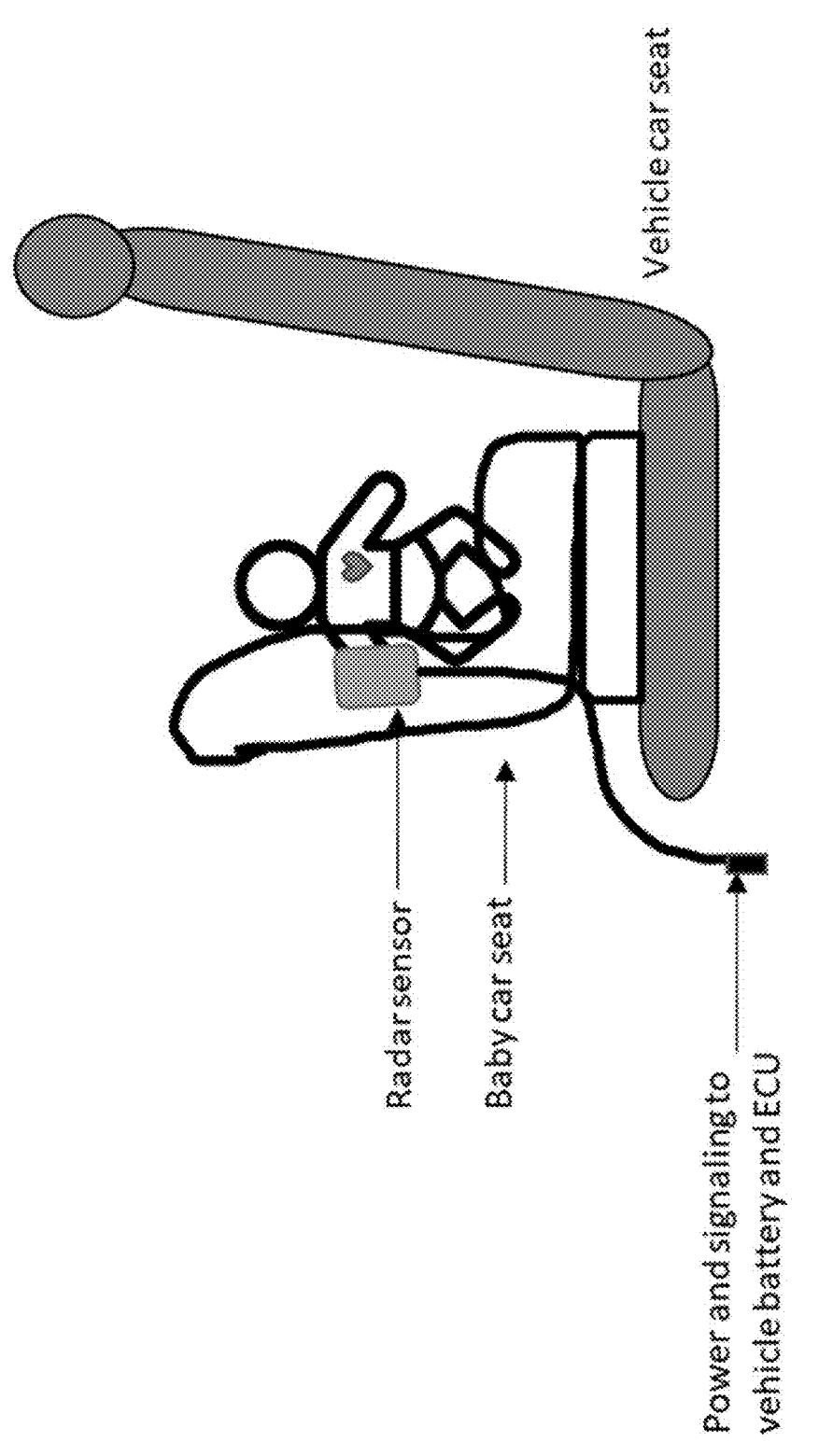
FIGS. 10 and 11 are schematic views of a rear-facing and a forward-facing car seat equipped with a radar sensor, with the radar sensor integrated within the seat body or as part of the safety belt or buckle.
Figure 11:
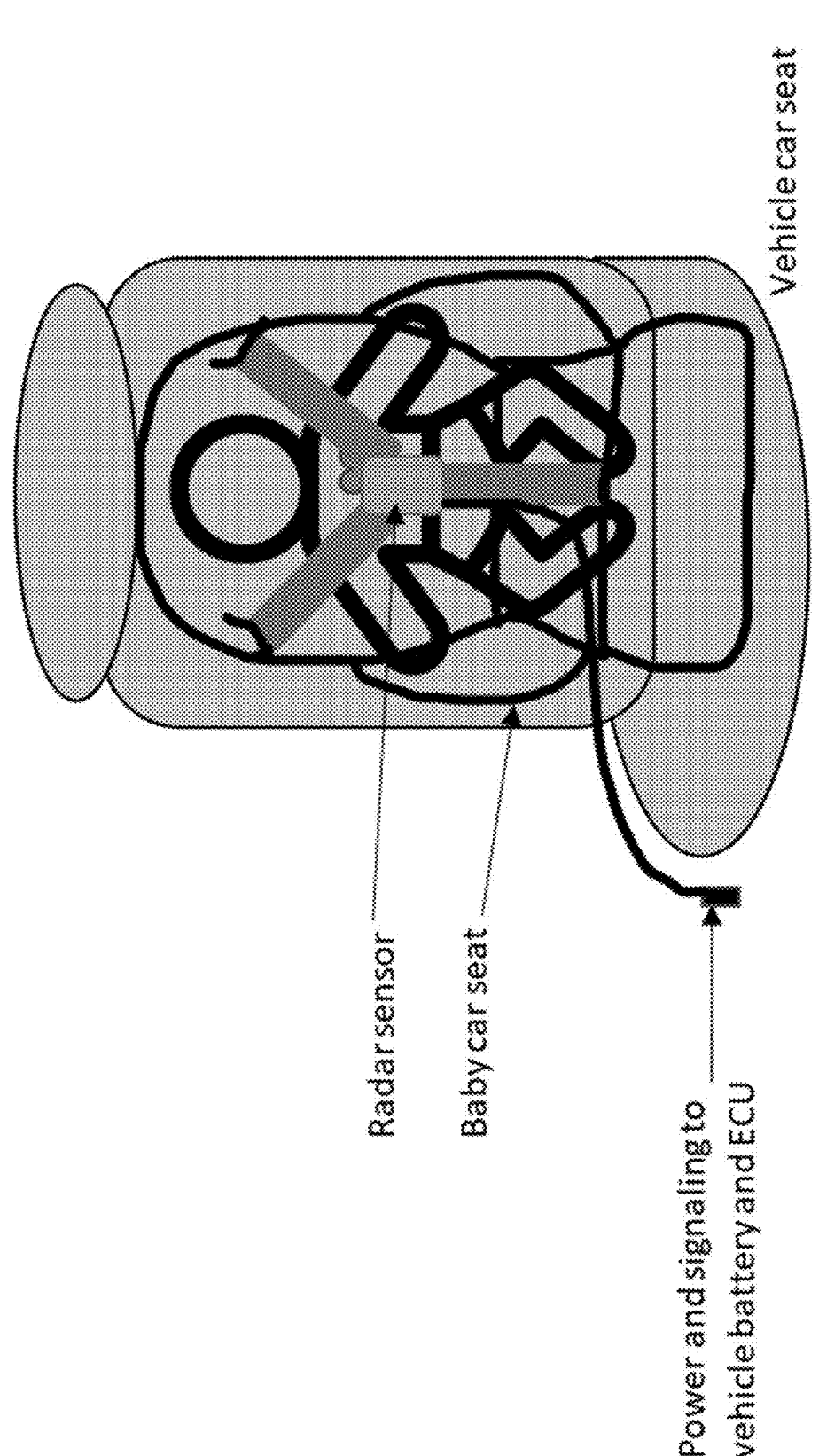

The radar sensor may employ a typical continuous wave (CW) or frequency-modulated continuous wave (FMCW) radar architecture, at a center frequency of, for example, 60 GHz. The radar sensor front-end may include a transmitter and a receiver (also known as radar transceiver) that typically includes one or more power amplifiers, low-noise amplifiers, a mixer, a signal synthesizer and/or a digital-to-analog converter (DAQ). As shown in the block diagram of FIG. 9, a processor and/or a microcontroller of the system or vehicle perform radar baseband signal processing, vital sign extraction, state machine, and communication with vehicle interfaces. Control signaling may travel through CAN bus to actuators for necessary actions or alerts. The system may integrate with any type or configuration of car seat, such as rear-facing (FIG. 10) or forward-facing (FIG. 11). A sensor-equipped car seat can be placed rearward-facing or forward-facing. If a sensor-equipped rearward-facing car seat is implemented, the sensor may be integrated within the seat body, and if a sensor-equipped forward-facing car seat is implemented, the sensor may be integrated within the seat belt or buckle.

Existing technology uses headliner-mount or pillar-mount sensors to remotely monitor the cabin of the vehicle to determine a child's presence. These approaches suffer from line-of-sight issues. Moreover, the sensor integration into the vehicle requires specified cabin interior modification. The solutions can be different on different vehicles, which may not be favored by manufacturers. Thus, implementations herein include a system that integrates a radar sensor into a child's car seat, which provides a standalone solution that is transferable, removable, and conveniently applicable to any vehicle. The close contact between the sensor and the child increases signal to noise ratio of vital sign signals from the chest wall movement.

The system utilizes radar sensors to measure one or more health characteristics or vital signs of occupants of a vehicle. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-

0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular occupant monitoring system, the vehicular occupant monitoring system comprising:

a radar sensor disposed at a vehicle equipped with the vehicular occupant monitoring system, the radar sensor sensing within an interior cabin of the vehicle;

wherein the radar sensor comprises a transmitter that transmits radio signals and a receiver that receives radio signals;

wherein the radar sensor is integrated into a seatbelt of the equipped vehicle;

wherein the radar sensor is operable to capture radar data;

an electronic control unit (ECU), the ECU comprising electronic circuitry and associated software;

wherein the electronic circuitry of the ECU comprises a processor operable to process radar data captured by the radar sensor;

wherein the seatbelt is configured to provide tension to press the radar sensor against a chest of an occupant to stabilize measurements of the radar sensor;

wherein the vehicular occupant monitoring system, responsive to processing by the processor of radar data captured by the radar sensor while the occupant of the equipped vehicle wears the seatbelt, determines phase information that correlates to chest wall movement comprising a combination of rib cage expansion motion and heart apex pounding motion; and wherein the vehicular occupant monitoring system, responsive to determining the phase information, determines a health characteristic of the occupant.

2. The vehicular occupant monitoring system of claim 1, wherein the health characteristic comprises at least one selected from the group consisting of (i) a heart rate of the occupant, (ii) a breathing rate of the occupant, and (iii) a heart rate variability of the occupant.

3. The vehicular occupant monitoring system of claim 1, wherein the occupant comprises a driver of the equipped vehicle, and wherein the vehicular occupant monitoring system, responsive to determining the health characteristic of the driver, controls a speed of the equipped vehicle.

4. The vehicular occupant monitoring system of claim 1, wherein the vehicular occupant monitoring system determines, using the health characteristic, an alertness of the occupant.

5. The vehicular occupant monitoring system of claim 1, wherein the vehicular occupant monitoring system, responsive to processing by the processor of radar data captured by the radar sensor while the occupant of the equipped vehicle wears the seatbelt, transmits an alert to emergency services.

6. The vehicular occupant monitoring system of claim 1, wherein the vehicular occupant monitoring system determines the health characteristic of the occupant using a machine learning model.

7. The vehicular occupant monitoring system of claim 6, wherein the machine learning model is trained using data associated with the occupant.

8. The vehicular occupant monitoring system of claim 1, wherein the vehicular occupant monitoring system, responsive to processing by the processor of radar data captured by the radar sensor while the occupant of the equipped vehicle wears the seatbelt, stores the determined health characteristic at a profile associated with the occupant.

9. The vehicular occupant monitoring system of claim 1, wherein radar data captured by the radar sensor is provided to the ECU via a cable.

10. The vehicular occupant monitoring system of claim 1, wherein the vehicular occupant monitoring system, responsive to the determined health characteristic of the occupant satisfying a threshold health value, generates an alert for the occupant.

11. A vehicular occupant monitoring system, the vehicular occupant monitoring system comprising:

a radar sensor, wherein the radar sensor comprises a transmitter that transmits radio signals and a receiver that receives radio signals;

wherein the radar sensor is operable to capture radar data;

wherein the radar sensor is integrated into a car seat configured to be disposed within a vehicle equipped with the vehicular occupant monitoring system;

an electronic control unit (ECU), the ECU comprising electronic circuitry and associated software;

wherein the electronic circuitry of the ECU comprises a processor operable to process radar data captured by the radar sensor when the car seat is disposed within the equipped vehicle;

wherein a seatbelt is configured to provide tension to press the radar sensor against a chest of an occupant of the car seat to stabilize measurements of the radar sensor;

wherein the vehicular occupant monitoring system, with the car seat disposed within the equipped vehicle, and responsive to processing by the processor of radar data captured by the radar sensor while the occupant of the equipped vehicle occupies the car seat, determines phase information that correlates to chest wall movement comprising a combination of rib cage expansion motion and heart apex pounding motion; and wherein the vehicular occupant monitoring system, responsive to determining the phase information, determines a health characteristic of the occupant.

12. The vehicular occupant monitoring system of claim 11, wherein the health characteristic comprises at least one selected from the group consisting of (i) a heart rate of the occupant, (ii) a breathing rate of the occupant, and (iii) a heart rate variability of the occupant.

13. The vehicular occupant monitoring system of claim 11, wherein the occupant comprises a child, and wherein the vehicular occupant monitoring system, responsive to determining the health characteristic of the child, alerts a user of the vehicle.

14. The vehicular occupant monitoring system of claim 11, comprising a temperature sensor, wherein the vehicular occupant monitoring system generates an alert responsive to a temperature of a cabin of the equipped vehicle captured by the temperature sensor.

15. The vehicular occupant monitoring system of claim 11, wherein the ECU is disposed in the vehicle and processes radar data that is captured by the radar sensor and that is wirelessly communicated to the ECU.

16. The vehicular occupant monitoring system of claim 11, wherein the ECU is disposed at the car seat and wirelessly communicates a signal to a vehicle-based ECU, and wherein the vehicle-based ECU, responsive to the determined health characteristic of the occupant satisfying a threshold health value, generates an alert.

17. The vehicular occupant monitoring system of claim 11, wherein the vehicular occupant monitoring system, responsive to the determined health characteristic of the occupant satisfying a threshold health value, generates an alert.

18. A vehicular occupant monitoring system, the vehicular occupant monitoring system comprising:

a radar sensor disposed at a vehicle equipped with the vehicular occupant monitoring system, the radar sensor sensing within an interior cabin of the vehicle;

wherein the radar sensor comprises a transmitter that transmits radio signals and a receiver that receives radio signals;

wherein the radar sensor is integrated into a seatbelt of the equipped vehicle;

wherein the radar sensor is operable to capture radar data;

an electronic control unit (ECU), the ECU comprising electronic circuitry and associated software;

wherein the electronic circuitry of the ECU comprises a processor operable to process radar data captured by the radar sensor;

wherein the seatbelt is configured to provide tension to press the radar sensor against a chest of an occupant to stabilize measurements of the radar sensor;

wherein the vehicular occupant monitoring system, responsive to processing by the processor of radar data captured by the radar sensor while the occupant of the equipped vehicle wears the seatbelt, determines phase information that correlates to chest wall movement comprising a combination of rib cage expansion motion and heart apex pounding motion;

wherein the vehicular occupant monitoring system, responsive to determining the phase information, determines a health characteristic of the occupant;

wherein the vehicular occupant monitoring system determines a threshold health value based on a profile associated with the occupant; and wherein the vehicular occupant monitoring system, responsive to the determined health characteristic of the occupant satisfying the determined threshold health value, generates an alert for the occupant.

19. The vehicular occupant monitoring system of claim 18, wherein the vehicular occupant monitoring system, responsive to processing by the processor of radar data captured by the radar sensor while the occupant of the equipped vehicle wears the seatbelt, stores the determined health characteristic at the profile associated with the occupant.

20. The vehicular occupant monitoring system of claim 18 wherein the vehicular occupant monitoring system determines the health characteristic of the occupant using a machine learning model.

21. The vehicular occupant monitoring system of claim 20, wherein the machine learning model is trained using data associated with the occupant.

\* \* \* \* \*